United States Patent [19]
Kita et al.

[11] 3,883,849

[45] May 13, 1975

[54] MEMORY UTILIZING MAGNETIC BUBBLE DOMAIN DEVICE

[75] Inventors: Yuzo Kita; Fumiyuki Inose, both of Kokubunji, Japan

[73] Assignee: Hitachi, Ltd., Japan

[22] Filed: Apr. 9, 1973

[21] Appl. No.: 349,632

[30] Foreign Application Priority Data

Apr. 7, 1972 Japan ............................ 47-34363

[52] U.S. Cl. ....................... 340/172.5; 340/174 TF

[51] Int. Cl. ............................................ G06f 1/00

[58] Field of Search .................... 340/172.5, 174 TF

[56] References Cited

UNITED STATES PATENTS

| | | | |
|---|---|---|---|
| 2,892,183 | 6/1959 | Selmer | 340/172.5 |
| 3,193,800 | 7/1965 | Shoultes | 340/172.5 |
| 3,271,745 | 9/1966 | Schauer | 340/172.5 |
| 3,275,994 | 9/1966 | Joseph | 340/172.5 |
| 3,701,125 | 12/1970 | Hsu Chang | 340/174 TF |

OTHER PUBLICATIONS

"Applications of Bubble Devices," Bonyhard et al., IEEE Transactions on Magnetics, Vol. Mag. 6, No. 3, 9/70; pp. 447–451.

*Primary Examiner*—Harvey E. Springborn
*Attorney, Agent, or Firm*—Craig & Antonelli

[57] ABSTRACT

A memory utilizing magnetic bubble domain devices is disclosed, the memory being characterized in that a magnetic bubble domain shift loop is formed in a circular form on a plane of the memory medium, a magnetic bubble domain generating element and a magnetic bubble domain sensing element are formed in the same predetermined area on the loop, the magnetic bubble domains are shifted by the rotating magnetic field from a rotating magnetic field generating means, either clockwise or counterclockwise along the shift loop, the difference between the externally designated address and the address in the place of the bubble domain generating element or of the bubble domain sensing element is detected, and the direction in which the magnetic bubble domains are rotatingly shifted is determined according to the difference detected.

11 Claims, 3 Drawing Figures

MEMORY UTILIZING MAGNETIC BUBBLE DOMAIN DEVICE

BACKGROUND OF THE INVENTION

1. Field of the Invention

The present invention relates to memories which can be effectively used for the purpose of internal or external memory devices in data processing units, and more particularly to memories of the type utilizing magnetic bubble domain devices, thus permitting the access time to be reduced.

2. Description of the Prior Art

External memory devices in use for data processors are of various types, among which are the magnetic drum, the magnetic disk and the magnetic tape, which devices are normally associated with a rotating body or similar means. Data is stored magnetically on the surface or the side of the rotating means and read afterward when necessary by the use of magnetic heads installed near the memory surface. One recognized problem inherent in this type of prior art memory has been difficulties in reducing the access time to a substantial rate because of the mechanical rotating mechanism upon which the memories are dependent. In the magnetic drum, the mean access time is generally about 10 ms. and in the magnetic disk it is about 30 to 100 ms.

In order to reduce the access time in the prior art, efforts have been directed to the following points.

1. To increase the rotating speed of the rotating means.
2. To use a plurality of magnetic heads per memory track.

Unfortunately, there are limitations on the rotating speed of the rotating means due to inherent mechanical considerations. On the other hand, the use of a plurality of magnetic heads leads to a considerable rise in the cost, since the magnetic head is the most expensive hardware element in the device. This offsets the cost advantage of an external memory. Under the circumstances, the realization of sufficiently short access time in an external memory device has not been satisfactorily achieved.

One solution to the prior art problem is the use of a magnetic bubble domain memory device instead of the rotating (or moving) magnetic memory media, by which a full-electronic external memory can be realized to increase the reliability, reduce the size, lower the cost, and speed up the memory access.

Even this type of memory, however, has been incapable of making a sufficiently short access time available.

SUMMARY OF THE INVENTION

A general object of the invention is to provide a memory device operable with a short mean access time.

Another object of the invention is to provide a memory device operable at a high access speed for programs which are processed in sequence or for usual programs performed by jumping across short distances.

General Part of the Invention

Briefly, the memory device of the invention utilizes magnetic bubble domain elements for memory purposes.

In the magnetic bubble domain element, a suitable magnetic field is applied to the element in the direction perpendicular to the crystal plane whereby the magnetic bubble domains are kept stable. The magnetic bubble domains may be shifted along an array of T- or Y-bar patterns of permalloy film formed on the crystal plane into which a rotating magnetic field is applied.

There is another known method in which a pulse current or an or an a.c. current is applied to the current loop disposed on the crystal plane, whereby a gradient is formed locally in the magnetic field in the neighborhood of the magnetic bubble domains and thus the bubble domains are shifted. The direction in which the bubble domains are moved can be reversed by reversing the direction of the applied rotating magnetic field or the phase of the a.c. current. It is also possible to stop the movement of the bubble domains by stopping the rotating magnetic field or the drive current. When these properties are utilized, only the data stored in the memory medium can be moved uniformly in the forward or reverse direction, unlike in the prior art where the memory medium itself is rotated or moved. The present invention utilizes this principle to reduce the access time.

In accordance with the present invention, a memory utilizing magnetic bubble domain devices employs a magnetic bubble domain shift loop formed in a circular form on a plane of the memory medium. A magnetic bubble domain generating element and a magnetic bubble domain sensing element are formed in the same predetermined area on the loop. The magnetic bubble domains are shifted by the rotating magnetic field from a rotating magnetic field generating means, either clock-wise or counter clock-wise along the shift loop. The difference between the externally designated address and the address in the place of the bubble domain generating element or of the bubble domain sensing element is detected, and the direction in which the magnetic bubble domains are rotatingly shifted is determined according to the difference detected.

The other objects, features and advantages of the present invention will be apparent from the following detailed description when read in conjunction with the accompanying drawings.

DESCRIPTION OF THE PREFERRED EMBODIMENT

Figure 1:
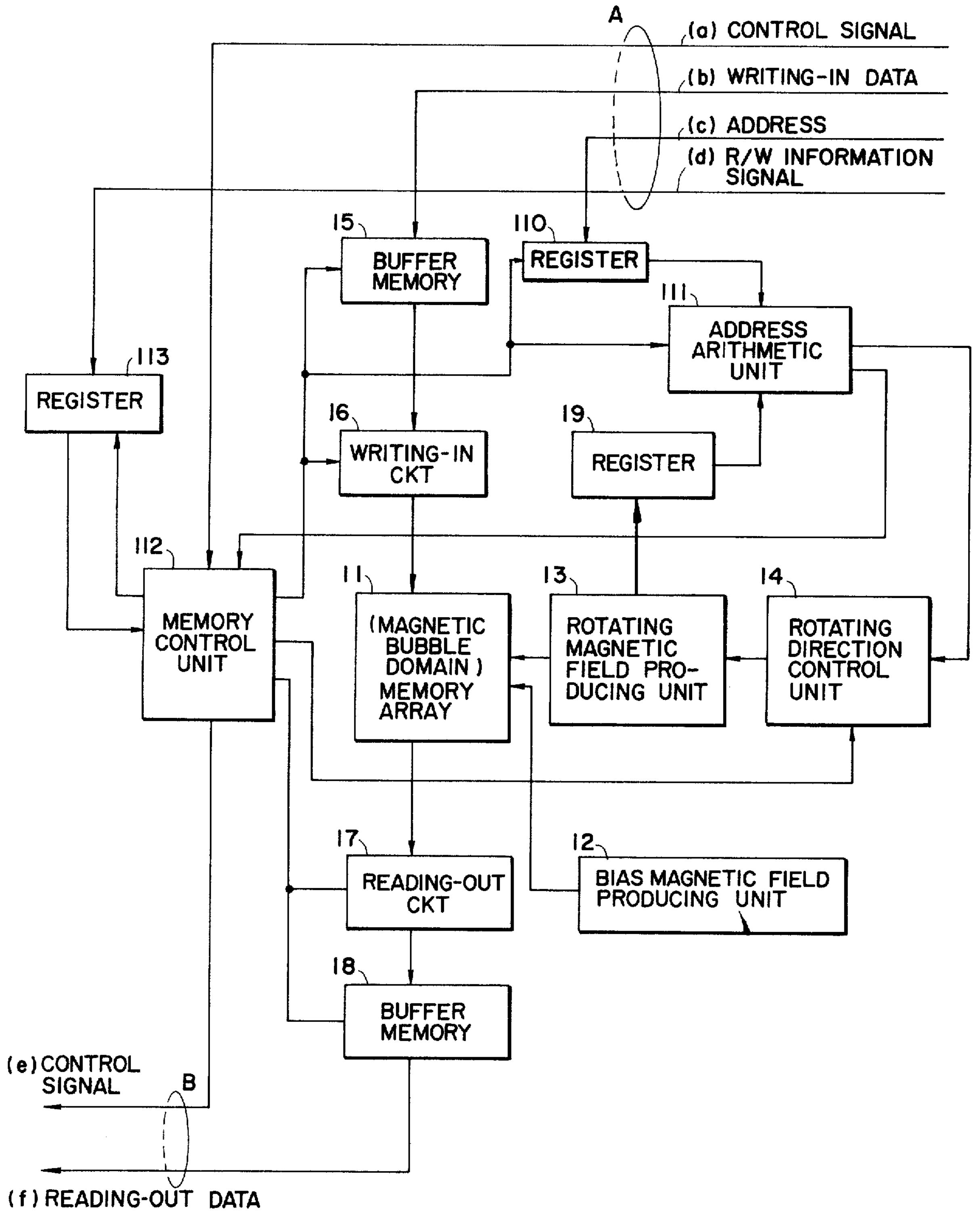
FIG. 1 is a block diagram showing a device embodying the present invention.

Referring to FIG. 1, there is shown in block form an embodiment of the invention including a magnetic bubble domain memory array or a magnetic bubble domain memory stack 11 of known construction, a standard bias magnetic field producing unit 12 for applying an adequate bias magnetic field to the memory array or stack 11 and a rotating magnetic field producing unit 13 for selectively supplying a uniform rotating magnetic field to the surface of the memory array 11, the rotating magnetic field being externally switchable into either a clockwise or a counterclockwise direction.

The numeral 14 represents a rotating magnetic field direction control unit which determines the rotating direction of the magnetic field by controlling the polarity of energizing potential applied to unit 13, for example, according to the result of the operation in an address arithmetic circuit 111 and delivers a command to the rotating magnetic field producing unit as regards the direction of field rotation. A buffer memory 15 is pro- 'ided for storing part or all of the data to be written in he memory of the invention; a circuit 16 is provided 'or transferring the data in the buffer memory 15 to the nemory array 11 according to the command from a nemory control unit 112; a circuit 17 is provided for 'eading the data from the memory array 11; and a buf'er memory 18 is provided for temporarily storing part or all of the data read out of the memory array through :he circuit 17. The buffer memory 15 for write data and :he buffer memory 18 for read data may be used in :ommon, or the two memories may not totally be used.

An internal address register 19 shows the existing ad-dress of the memory array 11. Generally, the bubble domain sensing element, such as a Hall element or a magnetic resistance element, and the bubble domain generating element are located in one common place on the memory array. Hence, one internal address register may suffice for both the write and read modes. If the two elements take different positions on the memory array, two address registers (the internal address register for write and the address register for read) must be provided. If so, these registers are to be switched according to the modes (write and read).

The system further includes an external address register 110 for setting the address requested to be externally written or read and an address arithmetic circuit 111 having two functions. One function of the circuit 111 is to compute the distance between the address indicated by the external address register 110 and the address indicated by the internal address register 19, and the other function is to detect the coincidence between the contents of the external and internal address registers. The address arithmetic circuit 111 supplies the computed result to the rotating magnetic field direction control unit 14 which thereby determines the direction of field rotation to reduce the access time. The result of coincidence detection is suppled to the memory control unit 112 which in turn initiates the write or read circuit. The memory control unit 112 controls the entire memory, supplies reasonable timings to the individual circuits, reduces the memory access time, and delivers initiate command signals to the individual units to allow the memory to maintain correct operation. As a result of the read operation, the register 113 sets the data indicating the transfer capacity which has been externally requested. Thus, this register is referred to as the transfer capacity indicating register.

In connection with the individual elements referred to above, making up the combination of the present invention, reference may be had to the following publications which disclose the individual elements themselves. The memory array 11, writing -in circuits 16, and reading -out circuits 17 are disclosed in the publication Scientific American in an article entitled "Magnetic Bubbles," by Andrew H. Bobeck and H. E. D. Scovil, Pages 78—90, published on June, 1971, Volume 224, No. 16. Suitable registers, for registers 119, 110 and 113 may be of the type disclosed in the "TTL Catalog Supplement" from Texas Instruments, Published Mar. 15, 1970. The address arithmetic unit 111 and the rotation direction control unit 14 may be of the type described in the "TTL Integrated Circuit Catalog" from Texas Instruments, Aug. 1, 1969. The memory control unit 112 may be of the type described in the publication "Sequential Access Ferrite Store With Stepping Switch Addressing" Electronic Engineering, Volume 36, No.439, 1964, Pages 612–615, or from "A Magnetic Associative Memory," IBM Journal, Apr., 1961, Pages 116–117, or from "A Three-Hundred nS Two Core-per-bit Scratch-pad Memory System" from Product Development Electronic Data Processing, Apr. 1966. The rotating magnetic field producing unit 13 may be of the type described in "A Magnetic Bubble Repertory Dialer Memory" by P. C. Michaelis et al., IEE Transactions on Mags. Vol. Mag-7 Sept. 1971, Pages 737 –740. The buffer memories 15 and 18 may be conventional buffer memories well known in the art.

The memory of the invention will be operated in the following manner.

The memory remains unoperated until it receives an external signal A, including a read/write control signal R/W(s), write-in data (b) in case of a write operation and an address (c). In other words, the memory is not operated in the state where no rotating magnetic field is applied to the memory array 11. When the memory control unit 112 receives the initial control signal (a), the address signal (c) is set in the external address register 110 by the signal from the control unit 112. At the same time, the read or write mode is judged according to the control signal (a). If it is the write mode W, the write data (b) is set in the buffer memory 15. Then, the memory control unit 112 delivers a command to the address arithmetic circuit 111 to cause this circuit to execute the above-described address computation.

Figure 2:
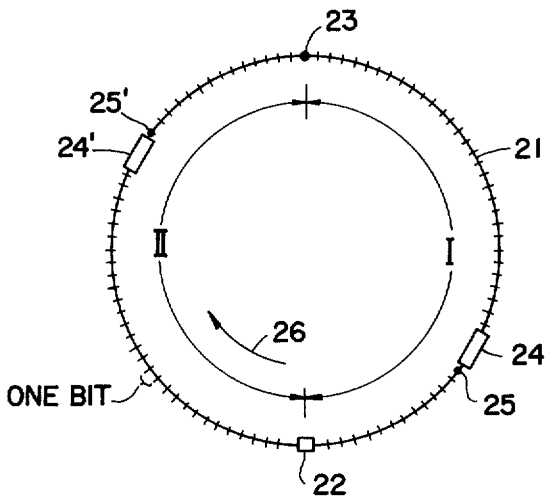
FIGS. 2 and 3 are diagrams illustrating the operating features of the device of the invention.

FIG. 2 is a diagram illustrating the contents of the arithmetic operation executed by the circuit 111. For explanatory simplicity, FIG. 2 shows only one of a plurality of magnetic bubble domain memory loops which constitute a magnetic bubble domain array. It should be noted that the memory loop corresponds to the memory track in the magnetic drum and the magnetic disk. In FIG. 2, the numeral 21 is a model of a magnetic bubble domain memory loop in circular form. This loop comprises arrays of T- or Y-bar pattern permalloy or ferromagnetic film as known in the art.

Figure 3:
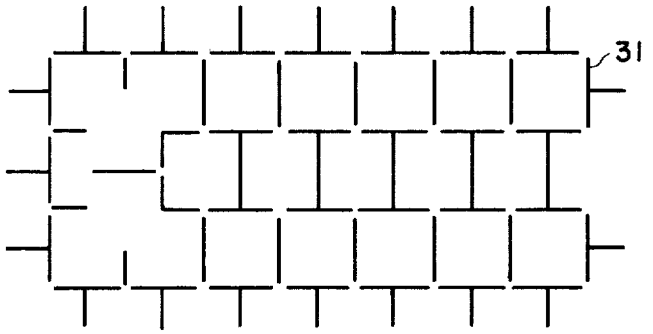

With the aim to increase the data density, the memory loop is staggered as shown in FIG. 3, instead of being of circular form, as seen in FIG. 2. In FIG. 3, the numeral 31 denotes a ferro-magnetic film, such as a permalloy film, formed on the surface of the magnetic bubble crystal. The magnetic bubble shifts by one bit in the direction marked by an arrow 26 of FIG. 2 when a rotating magnetic field is applied clockwise. It shifts by one bit in the reverse direction when a counterclockwise rotating field is applied. The magnetic bubble domain sensing element and the magnetic bubble producing element which are installed on the magnetic bubble loop are located at the position 22.

The address in the position of the magnetic bubble domain sensing element at time t is the contents of the internal address register 19 (FIG. 1) at time *t*. The position 23 is farthest from the position 22 in the magnetic bubble loop.

For example, let positions 24 or 24' indicate the address region required for write or read operation, as requested from outside the memory, and the positions 25 or 25' represent the initial address.

In this arrangement, therefore, the address indicated by 25 or 25' is set in the external address register 110. The transfer capacity indicated by the number of oblique lines in each of positions 24 or 24' is set in the transfer capacity indicating register 113.

Assume that the bit address 25 is externally designated. Then, it is apparent that the access time is reduced when the bubble domains are shifted in the direction of arrow 26 in the magnetic bubble loop by applying a rotating magnetic field clockwise. While, when the bit address 25' is externally designated, the access time is reduced by causing the magnetic bubble domains to be shifted by a counterclockwise rotating magnetic field.

The address arithmetic circuit 111 performs the operation required to judge whether the externally designated address is in the region I FIG. 2) or in the region II on the magnetic bubble loop. Various arithmetic methods can be considered for this judgement. For example, the content of the internal address register 19 is subtracted from the content of the external address register 110, and it is judged whether the absolute value of the subtracted result exceeds 1/2(2n−1), where (2n−1) is the bit capacity of the loop.

The result of the arithmetic operation is supplied to the rotating magnetic field control unit. As a result, the rotating field direction in which the memory access time is reduced is determined as described by referring to FIG. 2. The signal which indicates the determined rotating direction is supplied from the control unit 14 to the rotating magnetic field producing unit 13, to allow the rotating field to be rotated in the determined direction on the memory array 11.

In this operation, the content of the internal address register 19 should be renewed each time the rotating magnetic field makes one rotation.

To renew the content of the register 19, +1 is added to the content of the register 19 at each rotation of the magnetic field when this rotating field is clockwise or −1 added thereto when the field is rotated counterclockwise. Simultaneously with this operation, the address arithmetic circuit performs another function, i.e., detection of coincidence between the contents of the external address register 110 and of the internal address register 19. When coincidence is detected, the address arithmetic circuit delivers a signal to the memory control unit 112 which in turn sends a rotating magnetic field stop command to the rotating magnetic field control unit 14.

As a result of this operation, the rotating field stops temporarily. The access time of the memory system corresponds to the period from the time the memory receives the initiate command through the input control signal (a) to the time the rotating magnetic field halts.

The access time can be reduced to half as described above, by controlling the direction in which the magnetic bubble domains are moved.

The memory control unit 112 requests the rotating magnetic field direction control unit 14 to generate a clockwise rotating magnetic field and at the same time delivers an operation initiate command to either the write system circuit (15, 16) or the read system circuit (17, 18) according to the write or read mode. In the write mode, the circuit 16 is operated synchronously with the rotation of the magnetic field according to the content of the buffer memory for write data.

In the read mode, the signal detected by the magnetic bubble domain sensing element is amplified by the (amplifier) read circuit 17 synchronously with the rotation of the magnetic field and then set in the buffer memory 18 for read data, or sent out as an output data (*f*) to an external unit.

When the data is stored in the buffer memory 18, the memory control unit 112 reads out the data from the buffer memory 18, following the data transmission signal (*e*), and sends out the read data (*f*) to an external unit. While, when write or read processing starts, the memory control unit 112 adds −1 to the content of the transfer capacity indicating register 113 synchronously with the rotation of the rotating magnetic field each time the magnetic field makes one rotation. This processing, however, is not necessary for the system in which each processing capacity is specified. The −1 addition continues until the content of the register 113 reaches zero. When it reaches zero, the register 113 supplies a zero detection signal to the memory control unit 112. Upon receiving this signal, the memory control device generates a rotating magnetic field stop signal to the rotating magnetic field direction control unit 14 and thereby to stop the rotating magnetic field. At the same time, the memory control unit causes the write or read system circuit to stop its operation. Thus all the processing is completed.

The memory keeps its non-operating state until the processing initiate signal (*a*) is applied externally. One noteworthy feature of the magnetic bubble is to keep the memory halt temporarily. It is this shift halt function that enables usual sequence type programs to be processed at a high efficiency. In certain other programs, the jump distance in one program is limited by the procedure size, with the result that the execution often jumps to the nearby address. This is why the memory having a temporary shift halt function is effective for the purpose of reducing the memory access time. Also, it is often the case that the program jumps to an address in the vicinity along the direction opposite the forward processing direction. With this in view, it is apparent that the memory having the bubble shifting direction switching function is all the more desirable.

In the foregoing embodiment, the operation of the memory has been described by the use of one magnetic bubble domain memory loop, a bit address and its transfer functions. In a practical memory of the invention, data may be transferred in parallel or processed in parallel in bite unit or multiple of bite unit. In this case, the magnetic bubble domain memory loop, as shown in FIG. 2, is provided in the necessary number in parallel or parallel/series. For such operation, the least significant bit of the address register shown in FIG. 1 and also one bit of the transfer capacity indicating register will signify the unit of bite, block or sector according to the size of the memory. The principle applied to constitute and operate the memory of the invention is equally applicable to any expanded size of memory.

The invention has been described by referring to the socalled rotating magnetic field system which utilizes permalloy film patterns, in combination with a rotating magnetic field in order to move magnetic bubble domains. Instead, the known bubble memory array of the current loop system may be used, with which a memory having the same functions as above can be realized. In the current loop system, the magnetic bubbles can be shifted in either direction by reversing the phase or the polarity of the pulse current or a.c. current supplied to the current loop on the memory array.

Obviously many modifications and variations of the present invention are possible in the light of the above teachings. It should therefore be understood that within the scope of the appended claims, the invention may be practiced otherwise than as specifically described.

What is claimed is:

1. A memory comprising:

a magnetic bubble array having a plurality of magnetic bubble shift loops capable of shifting magnetic bubbles in both directions along the loop, a magnetic bubble generating element for generating magnetic bubbles, and a magnetic bubble sensing element for sensing said magnetic bubbles;

a first register including means for storing the address of the data to be written into the memory array;

a second register including means for storing the address of the position of the bubble generating element on the magnetic bubble memory array;

address arithmetic means including means for comparing the address of the data to be written into the memory array stored in the first register with the address of the position of the bubble generating element on the magnetic bubble memory array stored in the second register and for supplying a directional rotation signal corresponding to the type of non-equal comparision resulting therefrom;

drive means for shifting the magnetic bubbles in a selected direction along the loop by an electric signal applied to the magnetic bubble shift loops; and magnetic field rotation direction control means responsive to said address arithmetic means for supplying to said drive means said directional rotation signal which designates the direction in which the magnetic bubbles are to be shifted.

2. A memory as defined in claim 1, wherein said first register includes means for storing the address of the data to be read from the memory array;

said second register includes means for storing the address of the position of the bubble sensing element on the magnetic bubble memory array, and said address arithmetic means includes means for comparing the address of the data to be read from the memory array stored in said first register with the address of the position of the bubble sensing element on the magnetic bubble memory array stored in said second register and for supplying a directional rotation signal corresponding to the type of non-equal comparision resulting therefrom.

3. A memory as defined in claim 2 in which said magnetic bubble drive means comprises a rotating magnetic field generating device which selectively generates a rotating magnetic field clockwise or counterclockwise on the plane of the magnetic bubble memory array in response to said magnetic field rotating direction control means.

4. A memory as defined in claim 3 further including means for adding or subtracting the content of said second register by one unit according to the direction of the rotating magnetic field each time a rotating magnetic field is produced on the plane of the magnetic bubble memory array by said rotating magnetic field generating device to shift a magnetic bubble by one storage unit along a loop.

5. A memory as defined in claim 4 further comprising a control means for inhibiting the operation of said rotating direction control means in response to the output generated from the address arithmetic means representing detection of the contents of the first and second registers being coincident with each other.

6. A memory as defined in claim 5 in which the magnetic bubble generating element and the magnetic bubble sensing element are formed in a common location on the memory array.

7. A memory as defined in claim 6, further comprising: write circuit means for writing data in the magnetic bubble memory array; read circuit means for reading data from the magnetic bubble memory array; memory control means for controlling said write and read operations; third register means for setting the transfer capacity of write or read data; means for subtracting the content of the third register by one unit each time the rotating magnetic field in the plane of the magnetic bubble memory array makes one rotation; and means for inhibiting the operation of the memory control device by the signal generated from said third register means when the content of the third register reaches zero, and wherein the address arithmetic means includes means for determining whether the absolute value of the difference between the contents of the first and second registers exceeds half the loop bit capacity $(2^n-1)$.

8. A memory as defined in claim 3 further comprising a control means for inhibiting the operation of said rotating direction control means in response to the output generated from the address arithmetic means representing detection of the contents of the first and second registers being coincident with each other.

9. A memory as defined in claim 2 in which the magnetic bubble generating element and the magnetic bubble sensing element are formed in a common location on the memory array.

10. A memory as defined in claim 2 further comprising: write circuit means for writing data in the magnetic bubble memory array; read circuit means for reading data from the magnetic bubble memory array; memory control means for controlling said write and read operations; third register means for setting the transfer capacity of write or read data; means for subtracting the content of the third register by one unit each time the rotating magnetic field in the plane of the magnetic bubble memory array makes one rotation; and means for inhibiting the operation of the memory control device by the signal generated from said third register means when the content of the third register reaches zero.

11. A memory as defined in claim 2 in which the address arithmetic means includes means for determining whether, the absolute value of the difference between the contents of the first and second registers exceeds half the loop bit capacity $(2^n-1)$.

* * * * *